United States Patent
Vogt

(10) Patent No.: US 11,501,095 B2
(45) Date of Patent: *Nov. 15, 2022

(54) WIRELESS MONITORING AND PROFILING OF REACTOR CONDITIONS USING PLURALITY OF SENSOR-ENABLED RFID TAGS AND MULTIPLE TRANSCEIVERS

(71) Applicant: SHELL USA, INC., Houston, TX (US)

(72) Inventor: Kaspar Joseph Vogt, Houston, TX (US)

(73) Assignee: SHELL USA, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/960,757

(22) PCT Filed: Jan. 9, 2019

(86) PCT No.: PCT/US2019/012853
§ 371 (c)(1),
(2) Date: Jul. 8, 2020

(87) PCT Pub. No.: WO2019/139953
PCT Pub. Date: Jul. 18, 2019

(65) Prior Publication Data
US 2020/0349329 A1 Nov. 5, 2020

Related U.S. Application Data

(60) Provisional application No. 62/616,155, filed on Jan. 11, 2018.

(51) Int. Cl.
*G06K 7/10* (2006.01)
*B01J 8/18* (2006.01)
(Continued)

(52) U.S. Cl.
CPC ........ *G06K 7/10356* (2013.01); *B01J 8/1809* (2013.01); *B01J 8/1818* (2013.01);
(Continued)

(58) Field of Classification Search
CPC ....... B01J 8/1809; B01J 8/1808; G01D 21/02; G06K 19/0723; G06K 7/00; G06K 7/08; G06K 7/081
(Continued)

(56) References Cited

U.S. PATENT DOCUMENTS 6,301,546 B1 10/2001 Weinstein et al.
6,720,866 B1 4/2004 Sorrells et al.
(Continued)

FOREIGN PATENT DOCUMENTS

EP 1022548 A1 7/2000
WO 2003098175 A1 11/2003
(Continued)

OTHER PUBLICATIONS

Office Action Received for CN Application No. 201980007605.4, dated Sep. 3, 2021, 24 Pages(15 Pages of English Translation and 09 Pages of Official Copy).
(Continued)

*Primary Examiner* — Edwyn Labaze
(74) *Attorney, Agent, or Firm* — Shell USA, Inc.

(57) ABSTRACT

Disclosed is a system and method for wirelessly monitoring 5 process conditions within a reactor vessel. A plurality of sensor-enabled radio frequency identification (RFID) tags are disposed at unspecified or random locations throughout a catalyst bed of a vessel and are used to measure various conditions within the vessel. The sensor-enabled RFID tags are encoded with individual identification codes and are wirelessly linked to multiple 10 transceivers. The use of multiple transceivers allows for the application of triangu-
(Continued)

lation methods to identify the location of each of the sensor-enabled RFID tags in three dimensional space and for the interrogation of each sensor-enabled RFID tag to receive responsive transponder signals that carry information representative of the sensed condition within the reactor.

22 Claims, 3 Drawing Sheets

(51) Int. Cl.
G01D 21/02 (2006.01)
G06K 19/07 (2006.01)
(52) U.S. Cl.
CPC ......... *G01D 21/02* (2013.01); *G06K 19/0723* (2013.01); *B01J 2208/00017* (2013.01); *B01J 2208/00539* (2013.01); *B01J 2208/00548* (2013.01); *B01J 2208/00628* (2013.01)
(58) Field of Classification Search
USPC .......................... 235/451, 440, 439, 435, 375
See application file for complete search history.

(56) References Cited

U.S. PATENT DOCUMENTS

| | | | |
|---|---|---|---|
| 7,397,370 | B2 | 7/2008 | Bratkovski |
| 7,612,325 | B1 | 11/2009 | Watkins, Jr. et al. |
| 7,642,742 | B2 | 1/2010 | Curello et al. |
| 8,106,778 | B2 | 1/2012 | Killian et al. |
| 8,257,875 | B2 | 9/2012 | Rea et al. |
| 8,658,024 | B2 | 2/2014 | Long et al. |
| 9,035,766 | B2 | 5/2015 | Worthington et al. |
| 9,317,795 | B2 | 4/2016 | Forster |
| 9,412,061 | B2 | 8/2016 | Forster |
| 9,563,833 | B2 | 2/2017 | Swager et al. |
| 9,678,030 | B2 | 6/2017 | Potyrailo et al. |
| 9,824,252 | B1 | 11/2017 | Gibson |
| 10,210,445 | B2 | 2/2019 | Nikunen et al. |
| 2004/0233043 | A1 | 11/2004 | Yazawa et al. |
| 2007/0215709 | A1 | 9/2007 | Baude et al. |
| 2008/0114228 | A1 | 5/2008 | McCluskey et al. |
| 2009/0092522 | A1 | 4/2009 | Gregg et al. |
| 2009/0231127 | A1 | 9/2009 | Angell et al. |
| 2010/0070084 | A1 | 3/2010 | Steinberg et al. |
| 2013/0057390 | A1 | 3/2013 | Watt et al. |
| 2013/0284812 | A1 | 10/2013 | Cok et al. |
| 2014/0024121 | A1 | 1/2014 | Osso et al. |
| 2014/0294041 | A1 | 10/2014 | Zhang et al. |
| 2015/0268079 | A1 | 9/2015 | Lund et al. |
| 2015/0360343 | A1 | 12/2015 | Yavelberg |
| 2016/0315705 | A1 | 10/2016 | Langguth et al. |
| 2017/0188908 | A1 | 7/2017 | Hoss et al. |
| 2017/0253815 | A1 | 9/2017 | Nouri et al. |
| 2017/0286820 | A1 | 10/2017 | Nikunen et al. |

FOREIGN PATENT DOCUMENTS

| | | |
|---|---|---|
| WO | 2012104230 A1 | 8/2012 |
| WO | 2014062066 A1 | 4/2014 |
| WO | 2019139946 A1 | 7/2019 |
| WO | 2019139953 A1 | 7/2019 |
| WO | 2019139974 A1 | 7/2019 |

OTHER PUBLICATIONS

International Search Report and Written Opinion received for PCT Patent Application No. PCT/US2019/012882, dated Apr. 11, 2019, 9 pages.
International Search Report and Written Opinion received for PCT Patent Application No. PCT/US2019/012876, dated Apr. 11, 2019, 10 pages.
International Search Report and Written Opinion received for PCT Patent Application No. PCT/US2019/012843, dated Apr. 11, 2019, 9 pages.
International Search Report and Written Opinion received for PCT Patent Application No. PCT/US2019/012853, dated Apr. 8, 2019, 10 pages.
Office Action Received for Japanese Application No. 2020-538570, dated Aug. 30, 2022, 14 Pages(7 Pages of English Translation and 7 Pages of Official Copy).

WIRELESS MONITORING AND PROFILING OF REACTOR CONDITIONS USING PLURALITY OF SENSOR-ENABLED RFID TAGS AND MULTIPLE TRANSCEIVERS

CROSS REFERENCE TO RELATED APPLICATIONS

This is a national stage application of International application No. PCT/US2019/012853, filed 9 Jan. 2019, which claims priority of U.S. Provisional Application No. 62/616,155, filed 11 Jan. 2018.

FIELD OF THE INVENTION

This invention relates to a system and method for wirelessly monitoring and three-dimensional profiling of conditions within a process vessel such as a reactor.

BACKGROUND

Reactor vessels containing catalyst are common to refineries and chemical plants. In operating these reactors, it is desirable to measure or monitor the process conditions inside the vessel because this information can help in controlling the reaction conditions within the reactor vessel. Current methods for measuring the conditions inside a reactor vessel require having a physical connection, such as an electrical or pneumatic connection, to the sensor that transmits sensor-measured information for external display. One example of such measurement means is the use of thermocouples to measure temperature. In order to use a thermocouple to measure the temperature at a location within a reactor vessel, a thermowell is necessary. The thermowell is installed through the vessel wall, and it extends to a location at which temperature is measured within the vessel.

It is desirable to have the ability to measure and observe process conditions at locations within a reactor vessel and to wirelessly transmit the information for collection and processing at a remote location. It further is desirable to be able to provide a three-dimensional profile of conditions throughout the volume of a reaction zone defined by a vessel. We have proposed using sensor-enabled radio frequency identification (RFID) tags for measuring several of the conditions within a reactor volume, such as pressure, temperature, fluid composition, vapor and liquid composition, pH, and flow rate, and wirelessly transmitting the measured information for remote collection and processing.

An example of a sensor-enabled RFID tag used to measure environmental conditions is described in U.S. Pat. No. 7,397,370. This patent presents a system that provides for monitoring an environment using a plurality of radio frequency identification ("RFID") assemblies. The system may include an RFID tag, having an associated unique identification ("ID") code, configured with a sensor for sensing information regarding the environment, and an antenna for wirelessly transmitting the sensed information to a processing system. The transmitted information received by the processing system includes the sensed environmental information along with the associated identification code and is processed to provide for monitoring an environment and changes in the monitored environment.

Another reference that describes the use of sensor-enabled RFID tags for measuring and tracking variable environmental conditions is U.S. Pat. No. 8,106,778. This patent discloses a method and system capable of tracking variable conditions using radio frequency identification (RFID). An RFID sensor tag is used to measure a variable condition, such as location, temperature, pressure, and humidity. In response to an interrogation signal transmitted by an RFID reader device, the RFID sensor tag transmits a signal that includes associated tag identification data with the variable data representing the measured condition. The response signal includes both variable data and non-variable data so that the measured conditions can be associated with the tag identification data. The RFID reader device may also receive a plurality of response signals each from one of a plurality of RFID tags. In this case, at least one of the plurality of response signals can include variable data representing a measured condition at the respective one of the plurality of RFID tags and tag identification data of the respective one of the plurality of RFID tags.

Patent Publication US 2007/0215709 discloses an RFID-based sensor that includes RFID circuitry combined with a sensor. The sensor element is configured to change conductivity state based on its exposure to a physical condition of the ambient surroundings to which the sensor is exposed. These physical conditions may include the presence or absence of gas, light, sound, temperature, pressure, moisture, and/or other conditions of the environment. In response to an RF signal transmitted by an RFID interrogator, the RFID-based sensor transmits for receipt by the RFID interrogator an identification (ID) code and other information associated with present or prior exposure of the RFID-based sensor to one or more physical conditions. The RFID-based sensor may also be powered by the RF energy delivered by the RFID interrogator.

U.S. Pat. No. 9,317,795 discloses an RFID sensing system that includes an array of sensing elements disposed on a surface. Each sensing element includes an RFID microchip, an antenna operatively coupled to the microchip, and a pressure-sensitive material disposed on the antenna. An RFID reader system provides an interrogation signal to each sensing element that transmits a signal back to the RFID reader via the coupled antenna when the pressure-sensitive material of a sensing element of the mat is compressed.

These publications do not disclose or suggest anything about using sensor-enabled RFID tags to measure process or environmental conditions within a reactor vessel or to wirelessly transfer information related to measured conditions within a reactor vessel for further receipt, processing and use. The publications further fail to disclose or teach anything about providing for wireless monitoring and three-dimensional profiling of the physical conditions within a reaction zone defined by a reactor vessel.

We, however, have invented a system and method that provide for local sensing or measurement of environmental or process conditions at locations throughout a reaction zone of a reactor and for the wireless transmission by sensor-enabled RFID tags to multiple receivers of RF waves that contain specific tag identification information and information representative of the measured condition within the reactor. This allows for three-dimensional profiling of conditions within the reaction zone.

SUMMARY

Accordingly, provided is a system for wirelessly monitoring and profiling process conditions within a reactor vessel. The reactor vessel of the system defines a reaction zone, which includes a catalyst bed that comprises catalyst particles and a plurality of sensor-enabled RFID tags disposed within the catalyst bed. Included are transceivers that include a first RFID transceiver antenna, a second RFID transceiver antenna, and a third RFID transceiver antenna. The first RFID transceiver antenna is wirelessly linked to each sensor-enabled RFID tag of the plurality and is capable of transmitting a first interrogation signal and receiving a first RFID transponder signal that is transmitted responsive to the first interrogation signal. The second RFID transceiver antenna is wirelessly linked to each sensor-enabled RFID tag of the plurality and is capable of transmitting a second interrogation signal and receiving a second RFID transponder signal that is transmitted responsive to the second interrogation signal. The third RFID transceiver antenna is wirelessly linked to each sensor-enabled RFID tag of the plurality and is capable of transmitting a third interrogation signal and receiving a third RFID transponder signal that is transmitted responsive to said third interrogation signal. Each sensor-enabled RFID tag of the plurality is encoded with a unique non-variable identification code and is capable of sensing a reactor condition within the reaction zone, receiving interrogation signals from the transceivers, and, responsive to the interrogation signals, transmitting the RFID transponder signals. The RFID transponder signals include information representative of the unique non-variable identification codes and of a reactor conditions associated with the sensor-enabled RFID tags. The system provides for determining and three-dimensional profiling of process conditions throughout the reaction zone.

Also provided is a method for wirelessly monitoring and profiling process conditions within a reactor vessel. This reactor vessel defines a reaction zone, which includes a catalyst bed that comprises catalyst particles and a plurality of sensor-enabled RFID tags disposed within the catalyst bed. The catalyst bed is characterized as having a height and a width or diameter. The method includes transmitting interrogation signals by at least three RFID transceiver antennas. The interrogation signals are received by each sensor-enabled RFID tag. In response to the interrogation signals, each sensor-enabled RFID tag transmits its associated RFID transponder signal that includes information representing a unique non-variable identification code and a surrounding condition that is associated with the sensor-enabled RFID tag. The RFID transceivers antennas receive the associated RFID transponder signals that are processed to provide for three-dimensional profiling of the process conditions within the reaction zone.

BRIEF DESCRIPTION OF THE DRAWINGS

FIG. 3 illustrates a single sensor-enabled RFID tag among a plurality of sensor-enabled tags disposed within a catalyst bed and at least three RFID reader/interrogators that are wirelessly linked to the sensor-enabled RFID tag. The RFID reader/interrogators are connected to a computer system for processing the information contained in the received RF signals transmitted by the sensor-enabled RFID tag.

DETAILED DESCRIPTION

Figure 1:
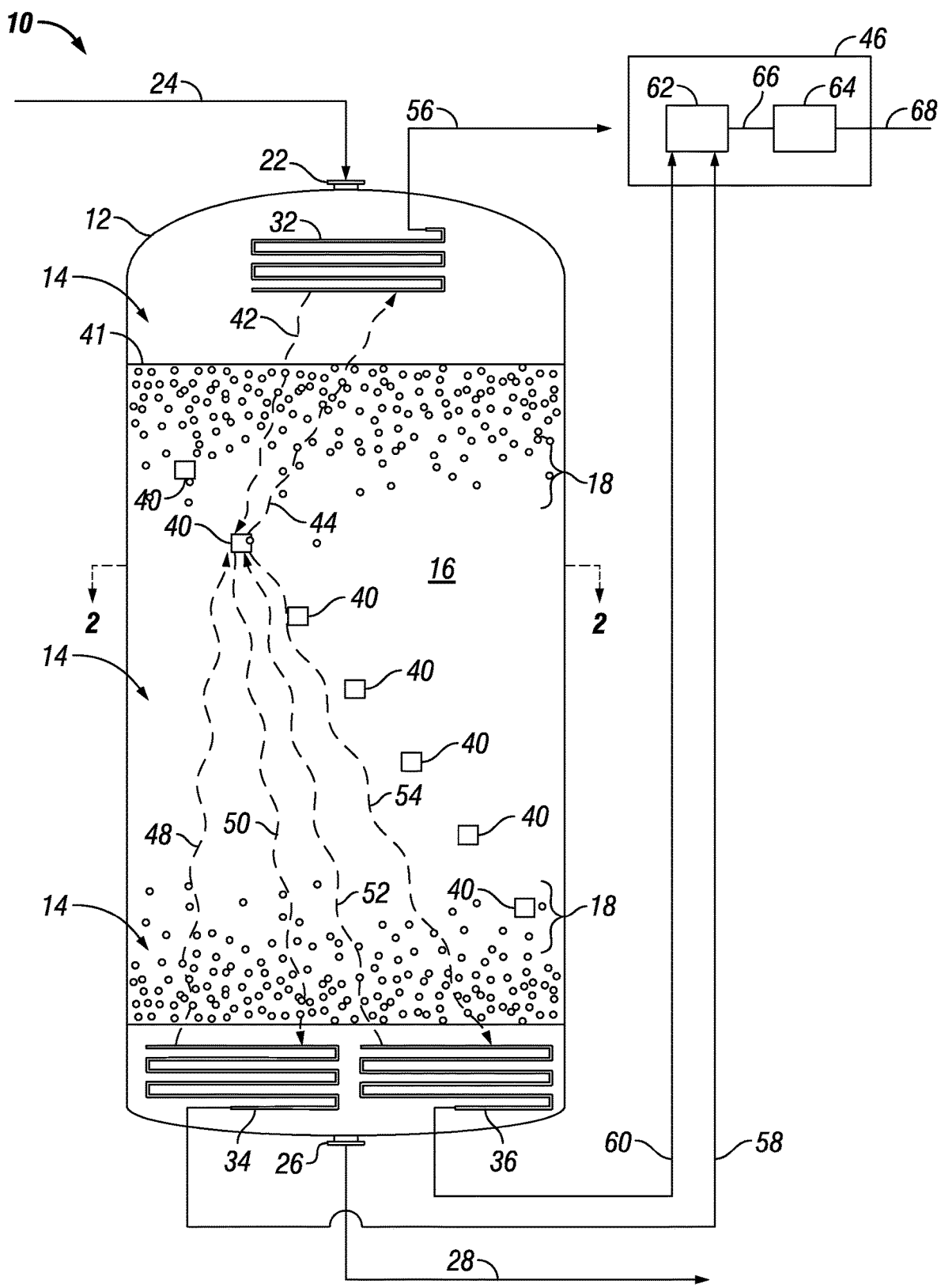
FIG. 1 is a schematic that represents an embodiment of the inventive system for wirelessly monitoring and three-dimensional profiling of conditions within the reaction zone of a reactor vessel.

Embodiments of the invention include both a system and method for wirelessly monitoring conditions within a reactor vessel and for providing three-dimensional profiles of the conditions throughout the reactor zone defined by the reactor vessel.

Filed concurrently with this patent application are the three related provisional patent applications entitled, "SP2118-*Wireless Monitoring and Profiling of Reactor Conditions Using Plurality of Sensor-Enabled RFID Tags Having Known Locations*," "SP2119*Wireless Monitoring and Profiling of Reactor Conditions Using Arrays of Sensor-Enabled RFID Tags Placed At Known Reactor Heights*," and "SP2066-*Wireless Reactor Monitoring System Using Passive Sensor Enabled RFID Tag*"; respectively having Ser. Nos. 62/616,148, 62/616,185, and 62/616,166.

Measured conditions within the reactor vessel can include process or environmental conditions, such as, the pressures or temperatures at various locations within a reactor vessel. The measured conditions may further include other parameters such as vapor and liquid percentages, flow rates, pH, and chemical compositions of fluids contained within or passing through the reactor vessel.

The invention provides for remotely measuring conditions within a reactor using a plurality of sensor-enabled RFID tags that are dispersed throughout the catalyst bed of a reactor, and, in one embodiment, they are placed at unspecified or random locations throughout the reaction zone of a reactor vessel. The sensor-enabled RFID tags wirelessly transmit measured information regarding sensed conditions within the reactor by radio wave transmission in response to interrogation signals transmitted by the several transceivers of the system.

The processing system includes means, such as a computer with associated program code, for processing the information contained in the signals transmitted by the sensor-enabled RFID tags of the plurality to provide a three-dimensional profile of the conditions within the reactor vessel. The system does this with transceivers and the plurality of sensor-enabled RFID tags with each sensor-enabled RFID tag of the plurality providing means for measuring or sensing one or more environmental conditions existing at locations within and throughout the reaction zone and catalyst bed of a reactor vessel.

In this specification, each sensor-enabled RFID tag of the plurality is a device that includes a sensor configured with or operatively connected to a passive RFID tag. The sensor provides means for sensing an environmental or process condition or parameter within the reactor vessel and means for providing a signal input, which contains information representative of the particularly measured condition or parameter, to the connected RFID tag. Passive RFID tags taught in the art include an integrated circuit coupled with a transponder antenna for receiving an interrogation signal from an RFID reader antenna (transceiver) and for transmitting a transponder signal in response to receiving the interrogation signal.

A processing system is used to process the signals transmitted by the sensor-enabled RFID tags. Since the sensor-enabled RFID tags are passive, each transmits an RFID transponder signal in response to receiving the interrogation signals transmitted by the several RFID reader antennas of the system. As noted above, each sensor is integrated with an RFID tag and is capable of sensing one or more conditions within the reaction zone.

The sensor component of the sensor-enabled RFID tags is selected from a group of any suitable sensor known to those skilled in the art. Examples of the environmental conditions or parameters sensed or measured by the sensors include pressure, temperature, chemical composition, vapor and liquid composition, density, flow rate, pH, vibration, radiation, magnetic flux, light intensity, conductivity, and sound intensity. Preferred sensor elements include those selected from the group consisting of temperature sensors, pressure sensors, chemical sensors, humidity sensors, pH sensors, flow sensors, liquid/vapor sensors and any combination thereof.

Each integrated sensor and RFID tag, i.e., the sensor-enabled RFID tag, provides means for sensing a reactor condition, receiving an interrogation signal, and, responsive to the interrogation signal, transmitting an RFID transponder signal containing information that is representative of the measured reactor condition. The patent publications US 2013/0057390; U.S. Pat. Nos. 9,563,833; 9,412,061; 9,035, 766; and WO 03/098175 present examples of sensor-enabled RFID tags. We incorporate these patent publications herein by reference.

A necessary feature of the invention is for each of the sensor-enabled RFID tags of the plurality to be encoded with a unique, non-variable identification code. This is important, because in response to receiving the transceiver signals from each of the multiple RFID transceivers, each sensor-enabled RFID tag transmits transponder signals containing unique tag identification data along with the variable data measured or sensed by the associated sensor. The transmission of the information representative of the unique non-variable tag identification code with the variable information representative of a reactor environmental condition measured or sensed by the RFID sensor provides for associating the transmitted variable information with a particular sensor.

The sensor-enabled RFID tags are disposed throughout the catalyst bed within the reaction zone of the reactor. In a preferred embodiment of the invention, numerous sensor-enabled RFID tags are placed within the catalyst bed at unspecified or random locations. Either two or more than two, such as, at least three transceivers are placed within or external to the reaction zone at locations so that they are wirelessly connected with the sensor-enabled RFID tags disposed within the catalyst bed. The transceivers are placed at known locations and distances from each other so that their interrogation signals can be used in combination with the transponder signals from the sensor-enabled RFID tags to obtain information concerning the distances and angular directions of the sensor-enabled RFID tags from the transceivers. The information relating to distances and angular directions should be such that a suitable triangulation method may be applied to determine the point locations of each sensor-enabled RFID tag in the three-dimensional space of the reaction zone.

The unique, non-variable identification code associated with each of the sensor-enabled RFID tags allows for identification of each sensor-enabled RFID tag with its point location in three-dimensional space that is determined by the application of the above-referenced triangulation method. Also, the use of the unique, non-variable identification code provides for connecting or associating each sensor-enabled RFID tag of the plurality with the reactor conditions sensed by it. Thus, each sensor-enabled RFID tag is capable of receiving an interrogation signal from each of the two or more transceivers, and, responsive to the interrogation signals, transmitting RFID transponder signals that include information representative of both the unique non-variable identification code and the measured reactor condition associated with the sensor-enabled RFID tag. This allows for the three-dimensional profiling of the measured environmental conditions within the reaction zone of the reactor.

The reactor vessel of the invention may be any suitable vessel made with any suitable material known to those skilled in the art. In many applications, the reactor vessel generally defines a volume that contains catalyst and into which is introduced reactants or feedstocks. In one embodiment of the invention, the reactor vessel defines a reaction zone within which is a catalyst bed comprising catalyst particles. The reaction zone may also include multiple beds of catalyst, including what are known as stacked beds. The reaction zone may be filled by any suitable arrangement of catalyst or catalyst beds, including being completely filled with catalyst particles or support particles, or both.

The reactor vessel may further be equipped with an inlet that provides fluid communication into the reaction zone and means for introducing a feed stream, such as hydrocarbons, into the reaction zone. The reactor vessel may also be equipped with an outlet that provides fluid communication from the reaction zone and means for removing an effluent stream, such as reaction products, from the reaction zone.

Any type of feed stream or fluid may be introduced into or contained within the reaction zone of the reactor vessel, including water, hydrocarbons, and other chemicals. Examples of hydrocarbons include light hydrocarbons such as those having from 1 to 4 or 5 carbon atoms, aromatics, naphtha, kerosene, diesel, gas oil, and heavy oil such as resid. Typically, the reaction zone contains one or more beds of catalyst particles along with any of the aforementioned fluids that preferably include any of the listed hydrocarbons.

The catalyst particles in the reaction zone may be of any size and shape typically used in industry, including extrudates of any shape (e.g., cylinders, dilobes, trilobes, and quadralobes), spheres, balls, irregular aggregates, pills and powders. The catalyst particle sizes can be in the range of from 0.1 mm to 200 mm, but, more typically, the size of the catalyst particles is in the range of from 0.5 mm to 100 mm, or from 1 mm to 20 mm, and they may have any composition.

Common catalyst compositions include an inorganic oxide component, such as, silica, alumina, silica-alumina, and titania. The catalyst composition further can comprise a catalytic metal component, such as any of the transition metals, including chromium, molybdenum, tungsten, rhenium, iron, cobalt, nickel, palladium, platinum, gold, silver, and copper. The concentration of the metal components of the catalyst particles may be upwardly to 60 wt. %, based on metal, regardless of its actual state, and, typically, the metal concentration is in the range of from 0.1 to 30 wt. %, based on metal, regardless of its actual state.

The sensor-enabled RFID tags of the plurality are disposed at unspecified or random locations within the catalyst bed of the reaction zone so that each of the sensor-enabled RFID tags is surrounded by catalyst particles. For a typical reactor, the geometric dimensions of depth and width define the catalyst bed. For reactors that are definable by depth and width, a typical depth of the catalyst bed is in the range of from 0.5 to 20 meters, and a typical effective width of the catalyst bed is in the range of from 0.5 to 20 meters. Thus, each of the sensor-enabled RFID tags can be surrounded by a layer or envelop of catalyst particles having a thickness upwardly to 20 meters requiring the interrogation and transponder signals to pass through a bed thickness of catalyst particles of from about 0.5 to about 20 meters.

A preferred embodiment of the invention comprises at least three RFID transceiver antennas each of which is wirelessly linked to each of the sensor-enabled RFID tags of the plurality. The transceivers are placed at known locations and distances relative to each other. The information regarding placement of the transceivers in combination with the distance and angular direction information relating to the placement of each sensor-enabled RFID tag of the plurality that is obtained by their interrogation using the transceivers is used in the application of the triangulation methodology to determine the three-dimensional point location of each sensor-enabled RFID tag of the plurality within the reaction zone or catalyst bed of the reactor.

In the preferred embodiment, a first RFID transceiver antenna is placed at a known location that is remote to the sensor-enabled RFID tags within the catalyst bed of the reaction zone; provided, that, the first RFID transceiver antenna is wirelessly linked to or coupled with each of the sensor-enabled RFID tags of the plurality. The first RFID transceiver antenna is configured to allow for transmission of a first interrogator signal to each of the sensor-enabled RFID tags of the plurality and for receiving responsive first RFID transponder signals from each of the sensor-enabled RFID tags of the plurality.

The preferred embodiment of the inventive system further includes a second RFID transceiver antenna that is placed at a known location remote to the sensor-enabled RFID tags within the catalyst bed of the reaction zone; provided, that, the second RFID transceiver antenna is wirelessly linked to or coupled with each of the sensor-enabled RFID tags of the plurality. The second RFID transceiver antenna is configured to allow for transmission of a second interrogator signal to each of the sensor-enabled RFID tags of the plurality and for receiving responsive second RFID transponder signals from each of the sensor-enabled RFID tags of the plurality.

The system also includes a third RFID transceiver antenna that is placed at a known location remote to the sensor-enabled RFID tags within the catalyst bed of the reaction zone; provided, that, the third RFID transceiver antenna is wirelessly linked to or coupled with each of the sensor-enabled RFID tags of the plurality. The third RFID transceiver antenna is configured to allow for transmission of a third interrogator signal to each of the sensor-enabled RFID tags of the plurality and for receiving responsive third RFID transponder signals from each of the sensor-enabled RFID tags of the plurality.

The first RFID transceiver antenna, second RFID transceiver antenna and third RFID transceiver antenna are placed at known locations and distances relative to each other or a reference point and to the sensor-enabled tags of the plurality so that triangulation can be applied to identify the point locations of each of the sensor-enabled tags in three-dimensional space of the reaction zone of the reactor.

It is preferred to position the RFID transceiver antennas within the reaction zone, since this eliminates the need for the interrogator signals and the transponder signals to pass through the wall of the reactor vessel. However, another embodiment of the inventive system is to position or place the RFID transceiver antennas external to the reactor vessel.

The RFID transceiver antennas are operatively connected to one or more readers that provide an interrogation signals to the RFID transceiver reader antennas and provide for receiving the RFID transponder signals transmitted by each of the sensor-enabled RFID tags of the plurality. Computer means provides for processing the information carried by each of the RFID transponder signals and for displaying or otherwise providing an output relating three-dimensional profile information about conditions throughout the reaction zone.

We now refer to FIG. 1, which is a schematic representation of an embodiment of inventive system 10 for wirelessly monitoring and profiling process conditions within reactor vessel 12. Reactor vessel 12 defines a reaction zone 14. Reaction zone 14 contains catalyst bed 16 filled with and comprising catalyst particles 18. Reactor vessel 12 is equipped with inlet nozzle 22 that is operatively connected to conduit 24. Inlet nozzle 22 provides means for fluid communication through conduit 24 and means for introducing a feed into reaction zone 14. Reactor vessel 12 is also equipped with outlet nozzle 26 operatively connected to conduit 28 and providing means for fluid communication through conduit 28 and means for removing an effluent from reaction zone 14.

FIG. 1 shows one embodiment of the inventive system 10 that includes first RFID transceiver antenna 32, second RFID transceiver antenna 34, and third RFID transceiver antenna 36 positioned within reaction zone 14. The RFID transceiver antennas are placed in three-dimensional space of reaction zone 14 at known locations and distances relative to each other.

While FIG. 1 shows that each of the RFID transceiver antennas is positioned within reaction zone 14, one or more of the RFID transceiver antennas may, alternatively, be placed at locations external to reactor vessel 12. It is important, however, to position the RFID transceiver antennas so that they are wirelessly linked to or coupled with each sensor-enabled RFID tag 40 of the plurality of sensor-enabled RFID tags 40 distributed throughout reaction zone 14 and disposed within catalyst bed 16.

While first RFID reader antenna 32 is shown as located above surface 41 of catalyst bed 16, it is understood that first RFID reader antenna 32 may be placed anywhere within reaction zone 14, including within the boundary of and surrounded by catalyst particles of catalyst bed 16. This also applies for second RFID reader antenna 34 and third RFID reader antenna 36, which are shown as located below catalyst bed 16. These RFID transceiver antennas may, as well, be placed anywhere within reaction zone 14, including within the boundary of and surrounded by catalyst particles of catalyst bed 16. As noted above, for each placement of a transceiver it should be wirelessly linked to each sensor-enabled RFID tag 40 of the plurality of sensor-enabled RFID tags 40.

Figure 2:
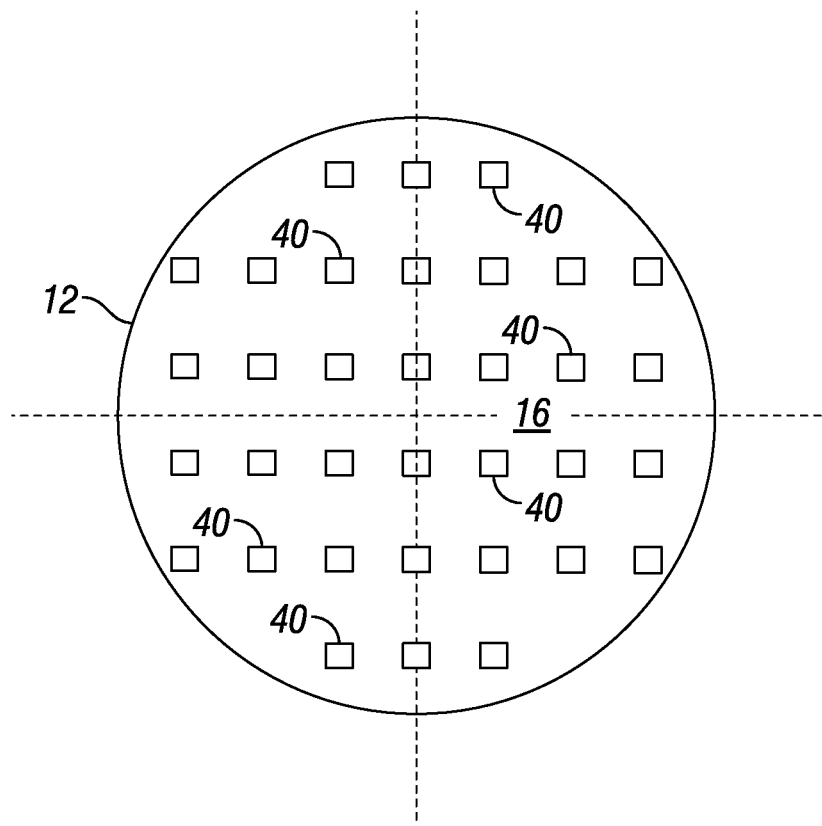
FIG. 2 is a plan view of cross-section A-A of the reactor vessel depicted in FIG. 1.

A plan view of cross section 2-2 is depicted in FIG. 2. The positions of each sensor-enabled RFID tag 40 are shown in FIG. 1 and FIG. 2, which illustrate how the plurality of sensor-enabled RFID tags 40 may be placed or disposed at unspecified or random locations throughout catalyst bed 16.

In the operation of inventive system 10, first RFID reader antenna 32 transmits first interrogation signal 42 to each sensor-enabled RFID tag 40 of the plurality. This is depicted in FIG. 1 by an RF wave arrow symbol 42 extending from first RFID reader antenna 32 to one of the sensor-enabled RFID tags 40 of the plurality of sensor-enabled RFID tags 40. However, it is recognized that first interrogation signal 42 is a radio wave that is simultaneously transmitted to all the sensor-enabled RFID tags 40 of the plurality distributed throughout catalyst bed 16.

Each sensor-enabled RFID tag 40 of the plurality receives first interrogation signal 42. In response to receiving first interrogation signal 42, each sensor-enabled RFID tag 40 respectively transmits its first associated RFID transponder signal 44 that includes information representative of the unique non-variable identification code encoded in the specific sensor-enabled RFID tag 40 and information representative of a variable reactor condition sensed or measured by and associated with the sensor-enabled RFID tag 40. The first associated RFID transponder signal 44 is received by first RFID transceiver antenna 32 and is processed by signal processing system 46.

FIG. 1 depicts the first associated RFID transponder signal 44 by an RF wave arrow symbol extending from a single sensor-enabled RFID tag 40 of the plurality. It is understood that each of the sensor-enabled RFID tags 40 will transmit its own individual first associated RFID transponder signal 44 that carries a unique, non-variable identification code and variable sensor information representative of a variable reactor condition sensed or measured by and associated with the specific sensor-enabled RFID tag 40.

Second RFID transceiver antenna 34 and third RFID transceiver antenna 36 are each configured relative to the plurality of sensor-enabled RFID tags 40 in a similar way as is first RFID transceiver antenna 32. Thus, second RFID reader antenna 34 transmits second interrogation signal 48 to each sensor-enabled RFID tag 40 of the plurality. This is depicted by an RF wave arrow symbol extending from second RFID reader antenna 34 to one of the sensor-enabled RFID tags 40 of the plurality of sensor-enabled RFID tags 40. It is noted, however, that second interrogation signal 48 is a radio wave that is simultaneously transmitted to all the sensor-enabled RFID tags 40 of the plurality distributed throughout catalyst bed 16.

Each sensor-enabled RFID tag 40 of the plurality receives second interrogation signal 48. In response to receiving second interrogation signal 48, each sensor-enabled RFID tag 40 respectively transmits its second associated RFID transponder signal 50 that includes information representative of the unique non-variable identification code encoded in the specific sensor-enabled RFID tag 40 and information representative of a variable reactor condition sensed or measured by and associated with the sensor-enabled RFID tag 40. The second associated RFID transponder signal 50 is received by second RFID transceiver antenna 34 and is processed by signal processing system 46.

Third RFID reader antenna 36 transmits third interrogation signal 52 to each sensor-enabled RFID tag 40 of the plurality. This is depicted by an RF wave arrow symbol extending from third RFID reader antenna 36 to one of the sensor-enabled RFID tags 40 of the plurality of sensor-enabled RFID tags 40. It is noted, however, that third interrogation signal 52 is a radio wave that is simultaneously transmitted to all the sensor-enabled RFID tags 40 of the plurality distributed throughout catalyst bed 16.

Each sensor-enabled RFID tag 40 of the plurality receives third interrogation signal 52. In response to receiving third interrogation signal 52, each sensor-enabled RFID tag 40 respectively transmits its third associated RFID transponder signal 54 that includes information representative of the unique non-variable identification code encoded in the specific sensor-enabled RFID tag 40 and information representative of a variable reactor condition sensed or measured by and associated with the sensor-enabled RFID tag 40. The third associated RFID transponder signal 54 is received by third RFID transceiver antenna 36 and is processed by signal processing system 46.

First RFID transceiver antenna 32, second RFID transceiver antenna 34 and third RFID transceiver antenna 36 are operatively connected to signal processing system 46 respectively by cables 56, 58 and 60. Signal processing system 46 provides means for providing interrogation signals to the RFID transceiver antennas and means for processing RFID transponder signals received by the RFID transceiver antennas.

Signal processing system 46 includes one or more readers 62 configured together with one or more computers 64 by cable 66, which provides means for communicating between readers 62 and computers 64. Computers 64 provide means for processing first RFID transponder signals 44, second RFID transponder signals 50, and third RFID transponder signals 54 received respectively by first RFID transceiver antenna 32, second RFID transceiver antenna 34, and third RFID transceiver antenna 36. Computers 64 provide output information 68 relating to the measured environmental conditions throughout reaction zone 14 and three-dimensional profiles of the measured environmental conditions throughout reaction zone 14 for display or storage in memory or any other suitable format.

FIG. 2 presents a plan view of the cross-section A-A of reactor vessel 12 shown in FIG. 1. FIG. 2 illustrates how each of the plurality of sensor-enabled RFID tags 40 might be placed at irregular, unspecified or random locations within reactor zone 14 of reactor vessel 12. What is meant when referring herein to the random placement of the sensor-enabled RFID tags 40 is that they may be dispersed throughout catalyst bed 16 with no particular pattern or order in mind. Thus, the sensor-enabled RFID tags are not necessarily in an ordered pattern. In one embodiment of the invention, the sensor-enabled RFID tags 40 are substantially evenly or homogeneously disposed throughout catalyst bed 16 at random locations.

Figure 3:
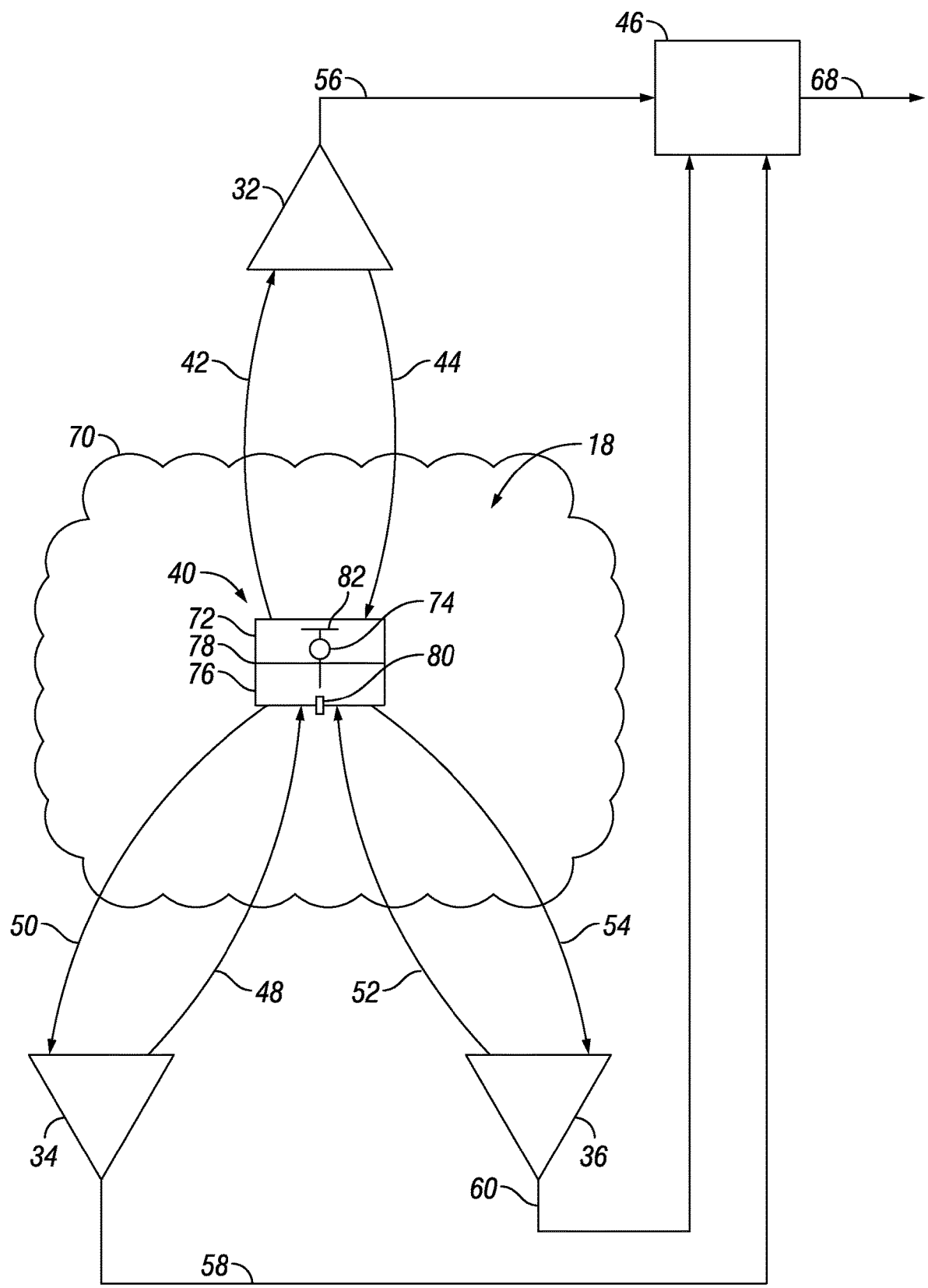
FIG. 3 is a diagram illustrating certain elements of the system for wireless reactor monitoring and three-dimensional profiling of conditions within the reaction zone of a reactor.

FIG. 3 presents an enlarged detail that includes a single, representative sensor-enabled RFID tag 40 among the plurality of sensor-enabled RFID tags 40 surrounded by environment 70 of catalyst particles 18. FIG. 3 further shows a relationship with certain other elements of inventive system 10 that includes first RFID transceiver antenna 32, second RFID transceiver antenna 34, third transceiver antenna 36 and signal processing system 46.

The sensor-enabled RFID tag 40 comprises a passive RFID tag 72 that includes an integrated circuit 74. Integrated circuit 74 provides for the storage of a non-variable identification code associated with and representing the specific sensor-enabled RFID tag 40. Sensor-enabled RFID tag 40 further provides for the receipt of variable input information from sensor 76 that is representative of at least one condition of environment 70.

Sensor 76 is configured with passive RFID tag 72 and is operatively connected to passive RFID tag 72 by connection 78. Sensor 76 is capable of sensing or detecting a condition of environment 70 by use of element 80 or any other suitable sensing means capable of providing an analog or digital input to integrated circuit 74 that is representative of the environmental condition measured. Integrated circuit 74 provides for the modulation of RFID transponder signals 44, 50, and 54 responsive to a sensor input signal provided via connection 78 so that RFID transponder signals 44, 50, and 54 include or carry information that is representative of the measured condition within environment 70. Contained within environment 70 are catalyst particles 18.

Integrated circuit 74 is operatively connected to RFID tag antenna 82 providing means for transmitting RFID transponder signals 44, 50 and 54 that carry, in addition to individual tag identification code information, variable input information from sensor 76 that is representative of at least one condition within environment 70 that surrounds or envelops sensor-enabled RFID tag 40. RFID transponder signals 44, 50 and 54 are transmitted in response to RFID tag antenna 82 receiving interrogation signals 42, 48 and 52 respectively from first RFID transceiver antenna 32, second RFID transceiver antenna 34, and third RFID transceiver antenna 36.

What is claimed is:

1. A system for wirelessly monitoring and profiling process conditions within a reactor vessel, wherein the system comprises:
the reactor vessel that defines a reaction zone, wherein within the reaction zone is a catalyst bed, comprising catalyst particles;
a plurality of sensor-enabled RFID tags disposed within the catalyst bed;
a first RFID transceiver antenna wirelessly linked to each sensor-enabled RFID tag of the plurality and configured to transmit a first interrogation signal and receive a first RFID transponder signal that is transmitted responsive to the first interrogation signal;
a second RFID transceiver antenna wirelessly linked to each sensor-enabled RFID tag of the plurality and configured to transmit a second interrogation signal and receive a second RFID transponder signal that is transmitted responsive to the second interrogation signal; and
a third RFID transceiver antenna wirelessly linked to each sensor-enabled RFID tag of the plurality and configured to transmit a third interrogation signal and receive a third RFID transponder signal that is transmitted responsive to the third interrogation signal;
wherein each sensor-enabled RFID tag of the plurality is encoded with a unique non-variable identification code, and
wherein each sensor-enabled RFID tag is configured to sense capable of sensing a reaction condition within the reaction zone, receive the first interrogation signal, the second interrogation signal, the third interrogation signal, and, responsive to the first interrogation signal, transmit the first RFID transponder signal, and, responsive to the second interrogation signal, transmit the second RFID transponder signal, and, responsive to the third interrogation signal, transmit the third RFID transponder signal;
whereby process conditions throughout the reaction zone are determined and profiled.

2. The system as recited in claim 1, wherein the catalyst particles comprise an inorganic oxide component and a metal component.

3. The system as recited in claim 2, wherein each sensor-enabled RFID tag of the plurality comprises an RFID tag operatively connected to sensor means for sensing an environmental or process condition and for providing a signal input to the RFID tag that is representative of the environmental or process condition.

4. The system as recited in claim 3, wherein one or more of the RFID transceiver antennas are positioned within the reaction zone of the reactor vessel.

5. The system as recited in claim 4, wherein the reactor vessel includes inlet means providing fluid communication for introducing a feed stream into the reaction zone and outlet means providing fluid communication for removing an effluent stream from the reaction zone.

6. The system as recited in claim 5, wherein the process condition is selected from the group of environmental conditions consisting of pressure, temperature, chemical composition, vapor and liquid composition, density, flow rate, pH, vibration, radiation, magnetic flux, light intensity and sound intensity.

7. The system as recited in claim 6, wherein each of the RFID transceiver antennas is operatively connected to a signal processing system providing means for providing the interrogation signals to the RFID transceiver antennas and for receiving the RFID transponder signals transmitted by each of the sensor-enabled RFID tags of the plurality.

8. The system as recited in claim 3, wherein one or more of the RFID transceiver antennas are positioned external to the reaction zone of the reactor vessel.

9. The system as recited in claim 8, wherein the reactor vessel includes inlet means providing fluid communication for introducing a feed stream into the reaction zone and outlet means providing fluid communication for removing an effluent stream from the reaction zone.

10. The system as recited in claim 9, wherein the process condition is selected from the group of environmental conditions consisting of pressure, temperature, chemical composition, vapor and liquid composition, density, flow rate, pH, vibration, radiation, magnetic flux, light intensity and sound intensity.

11. The system as recited in claim 10, wherein each of the RFID transceiver antennas are operatively connected to a signal processing system providing means for providing the interrogation signals to the RFID transceiver antennas and for receiving the RFID transponder signals transmitted by each of the sensor-enabled RFID tags of the plurality.

12. A method of wirelessly monitoring and profiling process conditions within a reactor vessel, wherein the method comprises:
providing the reactor vessel that defines a reaction zone, wherein within the reaction zone is a catalyst bed, comprising catalyst particles, and a plurality of sensor-enabled RFID tags disposed within the catalyst bed;
wherein each of the sensor-enabled RFID tags of the plurality is encoded with a unique non-variable identification code and is further configured to measure a surrounding condition within the catalyst bed that is associated with the sensor-enabled RFID tag and to transmit responsive to an interrogation signal a responsive signal that includes information representative of the unique non-variable identification code and the surrounding condition associated therewith;
transmitting by a first RFID reader (transceiver) antenna a first interrogation signal that is received by each of the sensor-enabled RFID tags;
in response to receiving the first interrogation signal, each of the sensor-enabled RFID tags transmits its first associated RFID transponder signal received by the first RFID reader antenna that includes information representing its unique non-variable identification code and surrounding condition that is associated with the sensor-enabled RFID tag;
receiving by the first RFID reader (transceiver) antenna the first associated RFID transponder signals;
transmitting by a second RFID transceiver antenna a second interrogation signal that received by each of the sensor-enabled RFID tags;
in response to receiving the second interrogation signal, each of the sensor-enabled RFID tags transmits its second associated RFID transponder signal received by the second RFID reader antenna that includes information representing its unique non-variable identification code and surrounding condition that is associated with the sensor-enabled RFID tag;
receiving by the second RFID transceiver antenna the second associated RFID transponder signals;

transmitting by a third RFID transceiver antenna a third interrogation signal that received by each of the sensor-enabled RFID tags;

in response to receiving the third interrogation signal, each of the sensor-enabled RFID tags transmits its third associated RFID transponder signal received by the third RFID reader antenna that includes information representing its unique non-variable identification code and surrounding condition that is associated with the sensor-enabled RFID tag;

receiving by the third RFID transceiver antenna the third associated RFID transponder signals; and processing the first associated RFID transponder signals, the second associated RFID transponder signals, and the third associated RFID transponder signals;

whereby conditions throughout the reaction zone can be determined and profiled.

13. The method as recited in claim 12, wherein the catalyst particles comprise an inorganic oxide component and a metal component.

14. The method as recited in claim 13, wherein each of the sensor-enabled tags of the plurality comprises an RFID tag operatively connected to sensor means for sensing an environmental or process condition and for providing a signal input to said RFID tag representative of the environmental or process condition.

15. The method as recited in claim 14, wherein one or more of the RFID transceiver antennas is positioned within the reaction zone of the reactor vessel.

16. The method as recited in claim 15, wherein the reactor vessel includes inlet means providing fluid communication for introducing a feed stream into the reaction zone and outlet means providing fluid communication for removing an effluent stream from the reaction zone.

17. The method as recited in claim 16, wherein the condition is selected from the group of environmental conditions consisting of pressure, temperature, chemical composition, vapor and liquid composition, density, flow rate, pH, vibration, radiation, magnetic flux, light intensity and sound intensity.

18. The method as recited in claim 17, wherein each of the RFID transceiver antennas are operatively connected to a signal processing system providing means for providing the interrogation signals to the RFID transceiver antennas and for receiving the RFID transponder signals transmitted by each of the sensor-enabled RFID tags of the plurality.

19. The method as recited in claim 14, wherein one or more of the RFID transceiver antennas are positioned external to the reaction zone of the reactor vessel.

20. The method as recited in claim 19, wherein the reactor vessel includes inlet means providing fluid communication for introducing a feed stream into the reaction zone and outlet means providing fluid communication for removing an effluent stream from the reaction zone.

21. The method as recited in claim 20, wherein the condition is selected from the group of environmental conditions consisting of pressure, temperature, chemical composition, vapor and liquid composition, density, flow rate, pH, vibration, radiation, magnetic flux, light intensity and sound intensity.

22. The method as recited in claim 21, wherein each of the RFID transceiver antennas is operatively connected to a signal processing system providing means for providing the interrogation signal to the RFID transceiver antennas and for receiving the RFID transponder signals transmitted by each of the sensor-enabled RFID tags of the plurality.

* * * * *